United States Patent
Kuo et al.

(10) Patent No.: US 10,019,215 B2
(45) Date of Patent: Jul. 10, 2018

(54) SIGNAL CONTROLLING METHOD AND DISPLAY PANEL UTILIZING THE SAME

(71) Applicant: AU OPTRONICS CORPORATION, Hsin-chu (TW)

(72) Inventors: Yu-Chieh Kuo, Hsin-chu (TW); Hsiang-Pin Fan, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/675,131

(22) Filed: Aug. 11, 2017

(65) Prior Publication Data

US 2018/0107439 A1    Apr. 19, 2018

(30) Foreign Application Priority Data

Oct. 18, 2016  (TW) .............................. 105133555 A

(51) Int. Cl.
*H04N 5/445* (2011.01)
*G06F 3/14* (2006.01)
*H04N 21/488* (2011.01)
*H04N 7/01* (2006.01)

(52) U.S. Cl.
CPC ....... *G06F 3/1415* (2013.01); *H04N 5/44513* (2013.01); *H04N 7/012* (2013.01); *H04N 21/4884* (2013.01); *G09G 2370/04* (2013.01)

(58) Field of Classification Search
CPC .............. H04N 5/44513; H04N 7/012; H04N 21/4884; G06F 3/1415; G09G 2370/04
USPC ......................................................... 348/625
See application file for complete search history.

(56) References Cited

U.S. PATENT DOCUMENTS

| | | | | |
|---|---|---|---|---|
| 4,875,106 A * | 10/1989 | Heitman | ................ | H04N 5/945 348/607 |
| 8,406,372 B2 * | 3/2013 | Hsu | ........................ | G11C 19/28 377/64 |
| 2007/0028274 A1 * | 2/2007 | Walker | ..................... | H04N 7/24 725/90 |
| 2007/0242080 A1 * | 10/2007 | Hamada | ................. | G09G 5/006 345/606 |
| 2008/0141091 A1 * | 6/2008 | Kalluri | ............. | H04N 21/43615 714/748 |
| 2010/0231797 A1 * | 9/2010 | Jiang | .................... | H04N 19/895 348/607 |

(Continued)

FOREIGN PATENT DOCUMENTS

TW          201505007 A        2/2015

*Primary Examiner* — Michael Lee
(74) *Attorney, Agent, or Firm* — Tim Tingkang Xia, Esq.; Locke Lord LLP

(57) ABSTRACT

A signal controlling method adapted for updating a display screen of a panel is disclosed. The signal controlling method includes the following steps: updating the display screen with first image data; determining whether second image data is received; when the second image data is not received, selectively generating an internal signal, using the internal signal to enable a shift register and returning to the step of updating the display screen with the first image data; and when an initiating signal and the second image data are received, enabling a plurality of shift register units of the shift register so that a plurality of scan signal lines of the panel are sequentially enabled and updating the display screen with the second image data.

12 Claims, 13 Drawing Sheets

(56) References Cited

U.S. PATENT DOCUMENTS

| | | | |
|---|---|---|---|
| 2012/0113068 A1* | 5/2012 | Chen | G09G 3/3677 |
| | | | 345/204 |
| 2014/0168049 A1 | 6/2014 | Gu et al. | |
| 2014/0219412 A1 | 8/2014 | Chien et al. | |
| 2014/0306969 A1 | 10/2014 | Tang et al. | |
| 2016/0335962 A1* | 11/2016 | Xiao | G09G 3/36 |

* cited by examiner

SIGNAL CONTROLLING METHOD AND DISPLAY PANEL UTILIZING THE SAME

CROSS-REFERENCE TO RELATED PATENT APPLICATION

This non-provisional application claims priority to and benefit of, under 35 U.S.C. § 119(a), Patent Application No. 105133555 filed in Taiwan R.O.C. on Oct. 18, 2016. The entire contents of the above identified application is incorporated hereby by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to a signal controlling method and a display panel, and in particular, to a signal controlling method and a display panel that are directed to a screen update.

BACKGROUND

Conventionally, during execution on a game screen, because synchronization between a screen output by a display adapter and a frequency of display sweep is not achieved, a situation of a broken or torn screen often occurs, which causes a user to be affected when the user is viewing a game screen. Therefore, some display adapter manufacturers develop a vertical synchronization function (V-Sync). By means of the V-Sync, a frequency of a display screen update is reduced, so as to achieve synchronization with a frequency of a display adapter update. However, under the architecture of an existing display panel, if a frequency of a display screen update changes, when a user views a display screen, the user would find the problem of inconsistent screen brightness.

SUMMARY

According to an embodiment of the present invention, a signal controlling method, applicable to updating a display screen of a panel, is provided. The signal controlling method includes updating the display screen with first image data; determining whether second image data is received; when the second image data is not received, selectively generating an internal signal, using the internal signal to enable a shift register, and returning to the step of updating the display screen with the first image data; and when the second image data is received, using an initiating signal to enable a plurality of shift register units in the shift register, so as to enable a plurality of scan signal lines of the panel in sequence, and updating the display screen with the second image data.

According to an embodiment of the present invention, a display panel, including a panel and a control module, is provided. The control module is electrically coupled to the panel, and the control module is configured to update a display screen of the panel with first image data, when second image data is not received, selectively generate an internal signal, and when the second image data is received, use an initiating signal to enable a plurality of shift register units in the shift register, so as to enable a plurality of scan signal lines of the panel in sequence, and update the display screen with the second image data.

According to another embodiment of the present invention, a display panel, including a panel, a control module, and a shift register, is provided. The panel includes a plurality of pixels. The control module is electrically coupled to the panel and configured to provide an initiating signal. The shift register is electrically coupled to the panel. The shift register includes a plurality of shift register units. The plurality of shift register units is connected in series to each other. Each shift register unit includes a first pull-up circuit, a second pull-up circuit, and a control circuit. The first pull-up circuit is configured to output, on the basis of a first control signal, a scan signal on an output end of the shift register unit according to a clock signal corresponding to the shift register unit, so as to enable corresponding pixels. The second pull-up circuit is configured to adjust, according to a second control signal and a second clock signal, a level of the first control signal to a level of a second output signal. The control circuit is electrically coupled to a first output signal and the first control signal, where a second pull-up circuit of a first stage shift register unit includes a signal input end for receiving an initiating signal, so as to update a display screen of the panel. The control circuit adjusts, according to the initiating signal, the first output signal or the first control signal to a first reference voltage, so as to disable a plurality of scan signal lines of the panel. After the scan signal lines are disabled, the shift register unit enables the plurality of scan signal lines of the panel in sequence, so as to update the display screen of the panel.

In conclusion, in the signal controlling method and display panel provided by the present invention, a plurality of internal signals is generated between externally provided initiating signals to further update a display screen with first image data repeatedly, so as to prevent the panel from material polarization when the panel performs frequency switching, thereby alleviating a brightness difference of a display screen.

These and other aspects of the present disclosure will become apparent from the following description of the preferred embodiment taken in conjunction with the following drawings, although variations and modifications therein may be effected without departing from the spirit and scope of the novel concepts of the present disclosure.

BRIEF DESCRIPTION OF THE DRAWINGS

The accompanying drawings illustrate one or more embodiments of the present disclosure and together with the written description, serve to explain the principles of the present disclosure. Wherever possible, the same reference numbers are used throughout the drawings to refer to the same or like elements of an embodiment, and wherein.

DETAILED DESCRIPTION

Figure 1:
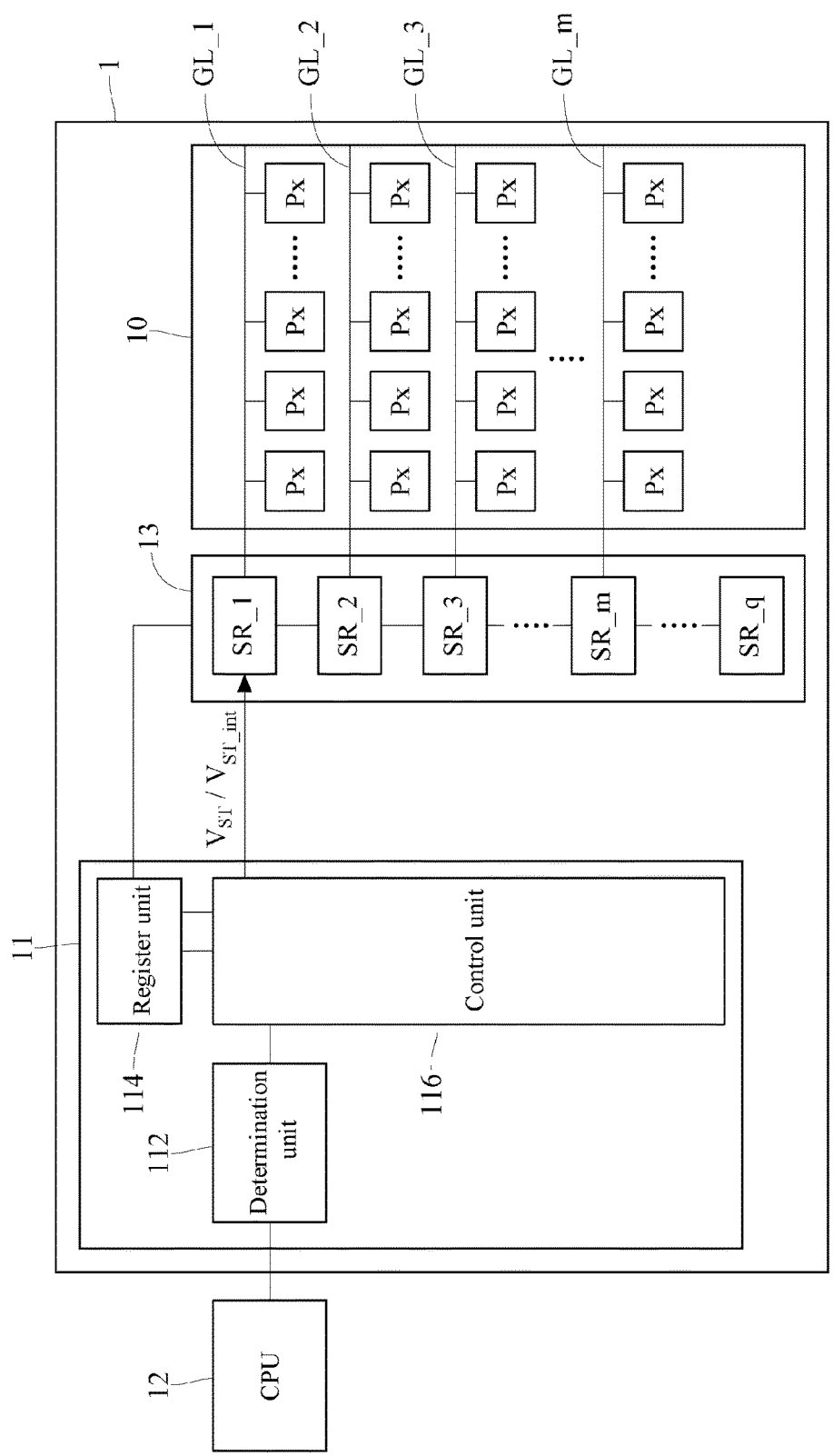
FIG. 1 is a schematic structural diagram of a display panel shown according to an embodiment of the present invention.

The detailed features and advantages of the present invention are described below in great detail through the following embodiments, and the content of the detailed description is sufficient for persons skilled in the art to understand the technical content of the present invention and to implement the present invention there accordingly. Based upon the content of the specification, the claims, and the drawings, persons skilled in the art can easily understand the relevant objectives and advantages of the present invention. The following embodiments further describe the viewpoints of the present invention, but are not intended to limit the scope of the present invention in any way.

The terms used in the present disclosure generally have general meanings of the terms in the background field of the present disclosure and meanings of the terms being used in a particular background. Some particular terms that are used to describe the present disclosure are defined and discussed below or are discussed in other places of the specification, to enable persons skilled in the art to understand the description of the present disclosure. In addition, a same object may be described in more than one manner, and it should be understood that the meaning of the object is selectively one of multiple description manners or a general meaning. Therefore, a replaceable expression or synonym is used herein to represent any one or more terms. No matter whether this term is elaborately described or discussed herein, the use of a replaceable expression and synonym does not have a particular meaning. The present disclosure provides synonyms of some terms. One or more common synonyms do not exclude the use of other synonyms. In this specification, an example mentioned in any position and an example including any discussed term are both used for description only, and do not limit the range and meaning of the present disclosure or any term that is used as an example for description. Similarly, the present disclosure is also not limited to various embodiments provided in this specification.

It may be understood that when an element is (electrically) coupled to another element, the element may be directly (electrically) coupled to the other element, or an element may exist between the element and the other element. In contrast, when an element is directly (electrically) coupled to another element, no element exists between the element and the other element. The actual interpretation thereof should depend on the content of the invention. For example, other relay elements may possibly be added between two elements, which, however, does not depart from the spirit of the disposition of (electrically) coupling an element to another element.

It may be further understood that, for the description of signal transmission or provision herein, a transmitted signal may be attenuated or distorted, but the attenuated or distorted signal still has a correspondence with the signal before transmission. A correspondence between two signals at a signal transmitting end and a signal receiving end is usually kept regardless of attenuation or distortion that occurs during transmission. In addition, a signal buffering unit and/or a signal strengthening unit may also exist between the signal transmitting end and the signal receiving end, to compensate for attenuation of a signal. However, this does not affect the correspondence between the two signals at the signal transmitting end and the signal receiving end.

It may be understood that, as used herein, the term "and/or" includes any one and all combinations of one or more related listed items, that is, the denotation of the term is forms in which multiple elements are connected in "and" and "or" manners.

It may be further understood that when an element is located on or above another element, the element may be directly located on the other element, or an element may exist between the element and the other element. In contrast, when an element is directly located on another element, no element exists between the element and the other element.

It may be further understood that terms such as "first", "second", and "third" are used to describe various elements, components, areas, layers and/or parts. However, these elements, components, areas, layers and/or parts should not be limited by these terms. These words are only used for distinguishing between an element, a component, an area, a layer and/or a part from another element, component, area, layer and/or part. Therefore, a first element, component, area, layer and/or part hereinafter may also be referred to as a second element, component, area, layer and/or part without departing from the concept of the present disclosure.

The terms used herein are only used for the objective of describing particular embodiments, rather than to limit the present disclosure. As used herein, unless clearly designated in the content, singular forms "a" and "the" also intend to include a plural form. It is further understood that when the term "include" or "have" is used in the specification, the presence of a feature, an area, a whole, a step, an operation, an element, and/or a member is clearly described, but the presence or addition of one or more other features, areas, wholes, steps, operations, elements, components and/or groups thereof is not excluded.

In addition, the relative terms such as "under" or "bottom", "on" or "top", and "left" or "right" herein may be used to describe a relationship between an element and another element shown in the drawings. It may be understood that, in addition to the positions depicted in the drawings, the relative terms intend to include different positions of the elements. For example, if elements in the drawings are inverted, an element that is described to be "under" another element becomes located "above" the other element. Therefore, the exemplary term "under" may include two positions "under" and "above" according to particular positions of the drawings. Similarly, if elements in the drawings are inverted, an element that is described to be "below" or "under" another element becomes located "above" the other element. Therefore, the exemplary term "below" or "under" may include two positions "above" and "below".

The term "approximately", "about" or "nearly" used herein should substantially mean that a value is within 20 percent of a given value or range, or preferably within 10 percent, or more preferably within 5 percent. An approximate quantity is provided herein, and it refers to that unless specifically indicated, the term "approximately", "about" or "nearly" may be used for representation.

In the claims verbs are used to limit apparatus claims. In particular cases, a person of ordinary skill in the art may understand that similar limitation is limitation on structural description rather than on a manufacturing method. For example, a first element is "welded" on a second element, a first element is "disposed" on a second element, a first element is "formed" on a second element, a lead is "grounded", a column is "twisted", a printed material is "applied" on a substrate, and a conductive via (or through hole) "exposes" a metal electrode there below.

The term "expose", "exposing" or "exposed" used herein does not mean that an element or a structure is exposed in external space, but may only mean that the element or structure is not completely covered by another element that covers the element or structure.

The term "surround", "surrounding", or a similar term used herein does not represent that a surrounding object must completely surround a surrounded object.

The term "adjacent", "neighboring" or a similar term used herein does not represent that another intermediate element is completely absent between two "adjacent" or "neighboring" elements.

If "system", "module", "functional unit", "operation unit", and "processing unit", or similar terms are used, they may denote an particular Application Specific Integrated Circuit (ASIC), an electronic circuit, electronic circuitry, a combination of logic circuits, a Field Programmable Gate Array (FPGA), a processor with an instruction processing capability, or other hardware structures applicable to executing functions of the foregoing elements, and may also denote a combination or some of the various forms exemplified above or a structure including the various forms exemplified above, for example, a system chip. Structures denoted by the "system", "module", "functional unit", "operation unit", and "processing unit", or similar terms may also include a memory, configured to store an instruction or code executed by a processor.

Referring to FIG. 1, FIG. 1 is a schematic structural diagram of a display panel shown according to an embodiment of the present invention. As shown in FIG. 1, a display panel 1 includes a panel 10 and a control module 11. The control module 11 is electrically coupled to the panel 10. In practice, the display panel 1 is coupled to an external graphics processing unit (GPU) 12, the GPU 12 is configured to perform a graphic operation, so as to transmit image data after the operation to the display panel 1, thereby displaying a frame on a screen. The GPU 12, for example, may be an upper-level control circuit of the display panel, a video card, a graphic chip, or a graphic chip integrated in another chip or the combination thereof. The panel 10 includes a plurality of pixels Px. In an example, each of the pixels Px includes a plurality of sub-pixels, which respectively correspond to three primary colors (RGB) of light, and further generates different images by using different gray-scale values of the sub-pixels. In the embodiment of FIG. 1, the display panel 1 further includes a shift register 13, electrically coupled to the panel 10 and the control module 11. The shift register includes a plurality of shift register units SR1_1 to SR_q. The plurality of shift register units SR1_1 to SR_q is connected in series to each other. In practice, the plurality of shift register units SR1_1 to SR_m is configured to output signals, so as to enable the plurality of scan signal lines GL_1 to GL_m on the panel 10 in sequence, so that the image data transmitted by the GPU 12 is written into the pixels. In an embodiment, the shift register units SR1_(m+1) to SR_q are dummy shift register units, and because no subsequent shift register unit is disposed for a last stage shift register unit of the shift register units SR1_1 to SR_m, so the dummy shift register units thereof may be used to pull down a level of a control signal or an output signal of the last stage shift register unit of the shift register units SR1_1 to SR_m.

Figure 2:
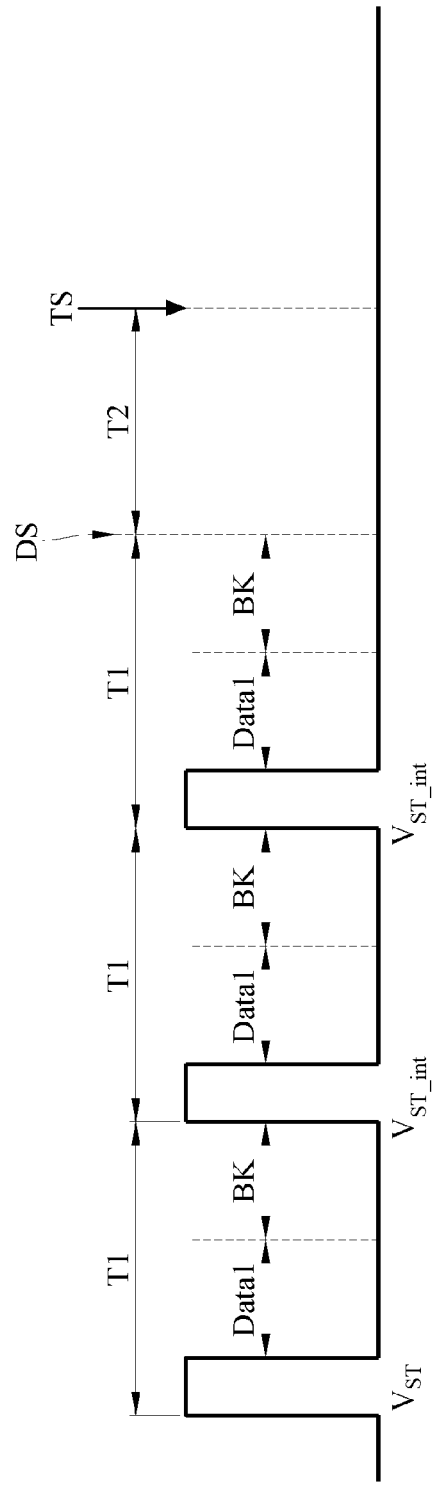
FIG. 2 is a waveform diagram of signal control shown according to an embodiment of the present invention.

Referring to FIG. 1 and FIG. 2 together, FIG. 2 is a waveform diagram of signal control shown according to an embodiment of the present invention. As shown in FIG. 2, after receiving first image data Data1, the control module 11 updates a display screen of the panel 10 with the first image data Data1. Specifically, the control module 11 first receives an initiating signal $V_{ST}$ (for example, a leftmost initiating signal $V_{ST}$ in FIG. 2), and the control module 11 further enables scan signal lines starting from a scan signal line GL_1 to a scan signal line GL_m in sequence by using the plurality of shift register units SR1_1 to SR_m. After enabling of the scan signal line GL_m is completed, the display screen of the panel 10 has been updated according to the first image data Data1. In practice, after each piece of pixel data of the first image data Data1 is written into a corresponding pixel, there is a blank interval BK.

Figure 3:
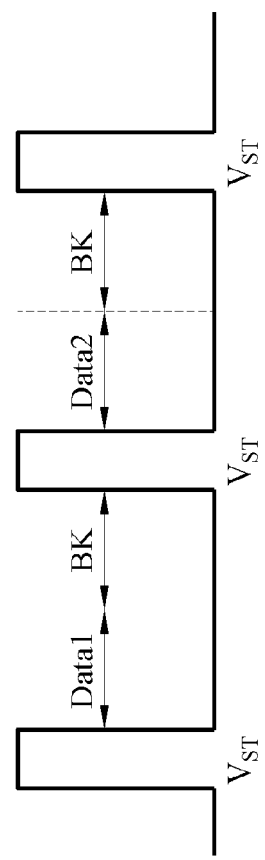
FIG. 3 is a waveform diagram of signal control shown according to an embodiment of the present invention.

After the first image data Data1 is written and the blank interval BK ends, when the control module 11 does not receive second image data Data2, the control module 11 selectively generates an internal signal $V_{ST\_int}$. As shown in FIG. 2, if the control module 11 generates the internal signal $V_{ST\_int}$, the same first image data Data1 is written into the panel 10 again. Referring to FIG. 1 and FIG. 3 together, FIG. 3 is a waveform diagram of signal control shown according to an embodiment of the present invention. As shown FIG. 3, after the first image data Data1 is written, when the control module 11 receives a next initiating signal $V_{ST}$ and the second image data Data2, the control module 11 uses the initiating signal $V_{ST}$ to enable the plurality of shift register units SR_1 to SR_m in the shift register 13, so as to further enable the plurality of scan signal lines GL_1 to GL_m in the panel 10 in sequence, and update the display screen of the panel 10 according to the second image data Data2.

In an embodiment, the control module 11 includes a determination unit 112, a register unit 114, and a control unit 116. As shown in FIG. 1, the control unit 116 is electrically coupled to the determination unit 112 and the register unit 114. The control unit 116 may be a control circuit, configured to perform data communication with an external device, for example, to read data in the register unit 114 or transmit data to a pixel Px of the panel 10. The determination unit 112 is configured to, after the display screen of the panel 10 is updated with the first image data Data1, determine whether the second image data Data2 is received. The determination unit 112 may be a hardware circuit, firmware, or software with a determination mechanism, configured to determine whether data is received. For example, when receiving an End of File (EOF) flag, the determination unit 112 determines that the second image data Data2 is received. In an embodiment, when the determination unit 112 determines that the second image data Data2 is received, the determination unit 112 further sends out the initiating signal $V_{ST}$ and the second image data Data2. In another embodiment, when the determination unit 112 determines that the second image data Data2 and the initiating signal $V_{ST}$ are received, the determination unit 112 further sends out the initiating signal $V_{ST}$ and the second image data Data2. In still another embodiment, when the determination unit 112 determines that the initiating signal $V_{ST}$ is received, the determination unit 112 further sends out the initiating signal $V_{ST}$ and the second image data Data2 from the GPU 12. In an embodiment, when the determination unit 112 determines that the second image data Data2 is received, the determination unit 112 further enables the control unit to output the initiating signal $V_{ST}$ and the second image data Data2. The sent second image data Data2 is used to update the register unit 114. In an embodiment, the register unit 114 may be a register or a memory and is a storage element that can be used to temporarily store an instruction, data, or an address. In this embodiment, when the second image data Data2 is not received, the register unit 114 stores data of each pixel of the first image data Data1. However, after the second image data Data2 is received, the second image data Data2 is used to rewrite the originally stored first image data Data1. When generating the initiating signal $V_{ST}$, control unit 116 reads the second image data Data2 stored in the register unit 114, outputs the initiating signal $V_{ST}$ to trigger the shift register 13, and writes the second image data Data2 into the panel 10—that is providing corresponding driving data voltage to the pixels PX of panel 10 according to image data Data2—, so as to update the display screen.

In an embodiment, when receiving an output signal G(m) of the shift register unit SR1_m, the determination unit 112 starts to calculate, according to a clock signal, a time interval (that is, the blank interval BK), and when the blank interval BK ends and the second image data Data2 is not completely received, selectively generates an internal signal $V_{ST\_int}$. In this embodiment, when the determination unit 112 receives an output signal G(n) of the dummy shift register unit SR1_n, but does not receive the complete second image data Data2, the determination unit 112 selectively generates an internal signal $V_{ST\_int}$. In an example, the internal signal $V_{ST\_int}$ is generated by the determination unit 112, and in another embodiment, the internal signal $V_{ST\_int}$ is generated by the control unit 116. If the determination unit 112 generates the internal signal $V_{ST\_int}$, the control unit 116 receives the internal signal $V_{ST\_int}$, and the internal signal $V_{ST\_int}$ triggers the plurality of shift register units SR1_1 to SR_m, so that the scan signal lines GL_1 to GL_m are enabled, and the first image data Data1 is written into the panel 10, so as to update the display screen. In a practical embodiment, assuming that the determination unit 112 receives an output signal G(n) of the physical shift register unit SR1_m (a non-dummy shift register unit), which represents that the blank interval BK ends, if the second image data Data2 is not completely received at this time, the control unit 116 generates the internal signal $V_{ST\_int}$, as shown in FIG. 2. Each time the control unit 116 generates the internal signal $V_{ST\_int}$, the display screen of the panel 10 is updated with the first image data Data1. Because the screen is updated rather frequently, when the display screen is updated with the same first image data Data1, in terms of the visual sense of a user, the panel 10 maintains the same display screen.

In an embodiment, as shown in FIG. 2, updating the display screen of the panel 10 with the first image data Data1 takes a first time length T1. The determination unit 112 is further configured to receive a detection signal DS sent by the external GPU 12. The detection signal DS is transmission information MS about the second image data Data2. The transmission information MS includes transmission time information of the initiating signal $V_{ST}$ and the second image data Data2. Specifically, when receiving the detection signal DS, the determination unit 112 may further learn, by means of the transmission information MS, specific time information of the second image data Data2 to be received. When the determination unit 112 does not receive the second image data Data2, the control unit 116 selectively generates, according to the transmission time information included in the transmission information MS and the first time length T1, the internal signal $V_{ST\_int}$.

Figure 4:
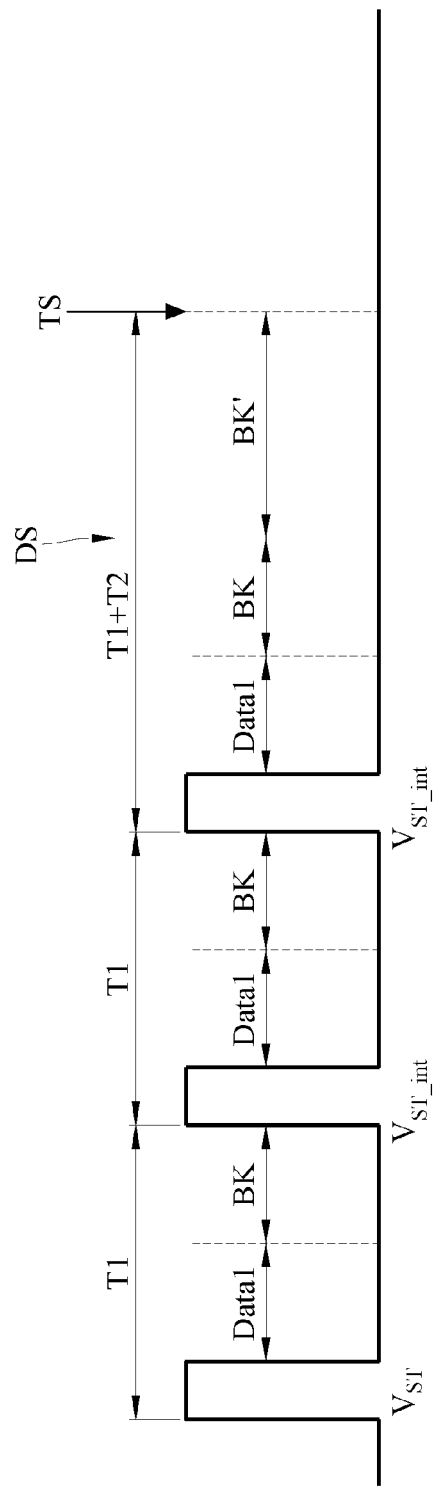
FIG. 4 is a waveform diagram of signal control shown according to an embodiment of the present invention.

In a practical example, as shown in FIG. 1 and FIG. 2, when the blank interval BK ends, the control module 11 requires the GPU 12 to send the detection signal DS to the determination unit 112. In another embodiment, the GPU 12 sends, on its initiative, the detection signal DS to the determination unit 112. Hence, the determination unit 112 can obtain the transmission time information TS included in the transmission information MS, that is, the determination unit 112 learns that the second image data Data2 would be received at the time point indicated by the time information TS. In another embodiment, the GPU 12 sends, before the blank interval BK ends, the detection signal DS to the determination unit 112. In this way, the determination unit 112 may further perform an operation to obtain a second time length T2 before the second image data Data2 is received. In the embodiment of FIG. 2, the second time length T2 is a time length between a time point when the last blank interval BK ends and a time point of the transmission time information TS. If the determination unit 112 determines that the second time length T2 is less than the first time length T1, the first time length T1 is prolonged. Referring to FIG. 2 and FIG. 4 together, FIG. 4 is a waveform diagram of signal control shown according to an embodiment of the present invention. In the example of FIG. 2, when the determination unit 112 determines that the second time length T2 is less than the first time length T1, as shown in FIG. 4, the control module 11 stops the screen update, which is equivalent to that the blank interval is continuously prolonged until the determination unit 112 receives the second image data Data2 at the time point of the time information TS. That is, as shown in FIG. 4, there is a blank interval BK' behind the blank interval BK. After the determination unit 112 receives the second image data Data2, the second image data Data2 is transmitted to the register unit 114. The control unit 116 reads the second image data Data2 stored in the register unit 114 and updates the display screen of the panel 10 according to the initiating signal $V_{ST}$. In this embodiment, because the control unit 116 generates an internal signal $V_{ST\_int}$ to write the first image data Data1 into the panel 10, which needs to occupy the first time length T1 in terms of time, if it is learned, according to the time information TS of the received second image data Data2, that the second time length T2 is less than first time length T1, the internal signal $V_{ST\_int}$ cannot be successfully generated to enable the first image data Data1 to be written. In other words, in the process of generating the internal signal $V_{ST\_int}$ to enable the first image data Data1 to be written into the panel 10, the second image data Data2 is received, and at this time, an error would occur in display of the panel 10. Therefore, by prolonging the blank interval BK stated above, the problem of an screen display error can be avoided.

Figure 5:
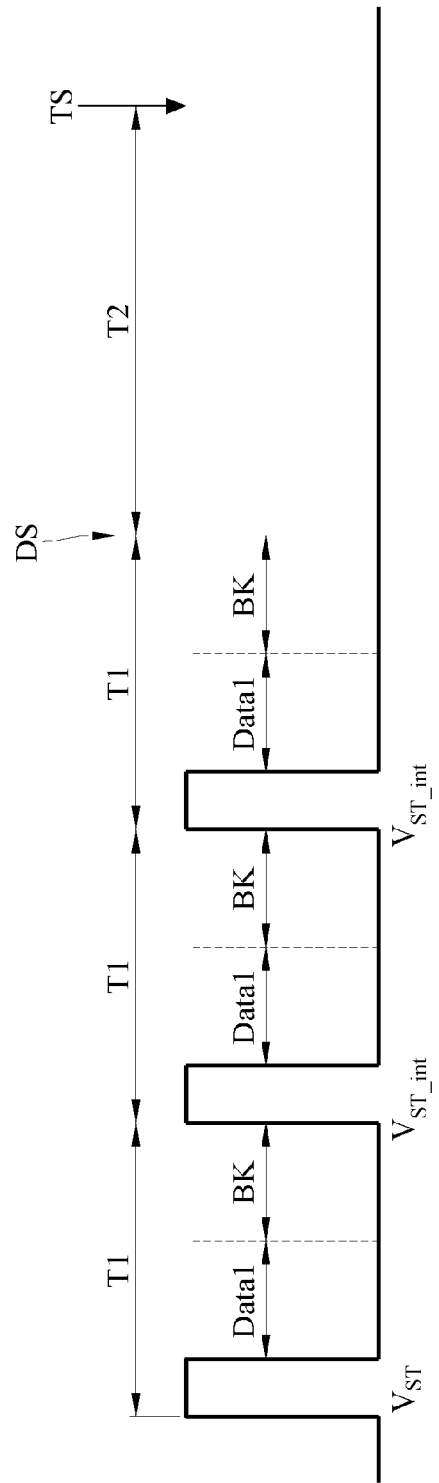
FIG. 5 is a waveform diagram of signal control shown according to an embodiment of the present invention.
Figure 6:
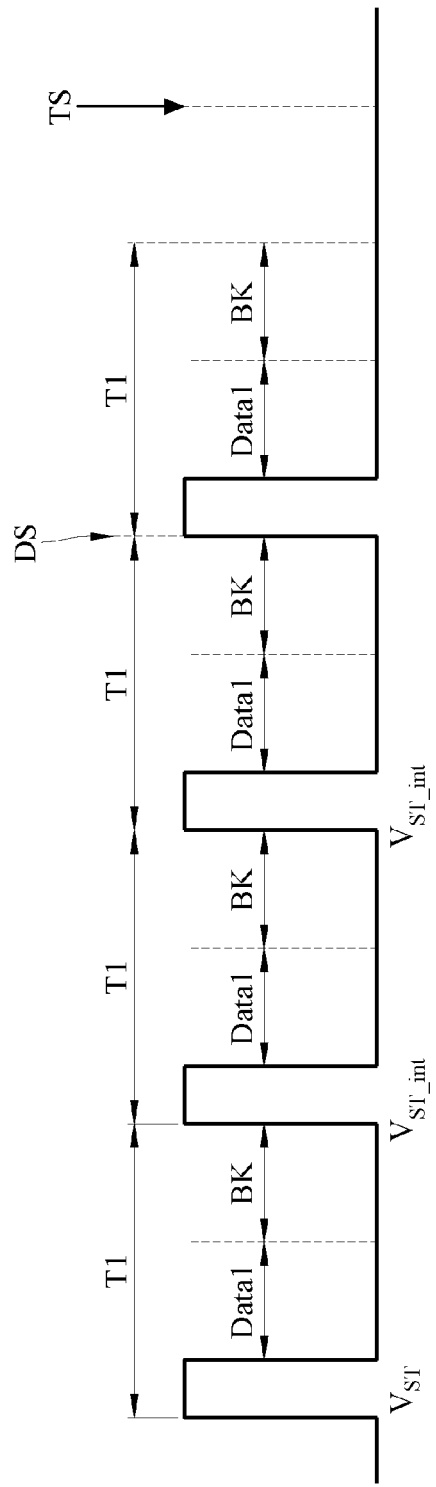
FIG. 6 is a waveform diagram of signal control shown according to an embodiment of the present invention.

Referring to FIG. 5 and FIG. 6 together, FIG. 5 and FIG. 6 are waveform diagrams of signal control shown according to an embodiment of the present invention. As shown in FIG. 5, if the determination unit 112 determines that the second time length T2 is less than the first time length T1, the control unit 116 generates an internal signal $V_{ST\_int}$, as shown in FIG. 6. The control unit 116 writes, according to the generated internal signal $V_{ST\_int}$, the first image data Data1 into the panel 10, so as to update the display screen. In the embodiment of FIG. 5 and FIG. 6, because the second time length T2 is merely slightly greater than the first time length T1, the control unit 116 generates only one internal signal $V_{ST\_int}$ in the second time length T2. However, in other examples, when the second time length T2 is much greater than the first time length T1, the control unit 116 generates a plurality of internal signals $V_{ST\_int}$ in the second time length T2. In an example, when the second time length T2 is much greater than the first time length T1, the control unit 116 generates a plurality of internal signals $V_{ST\_int}$ in the second time length T2, and time lengths occupied by the control unit 116 for rewriting, according to the internal signals $V_{ST\_int}$, the first image data Data1 are similar but not equal.

Figure 7:
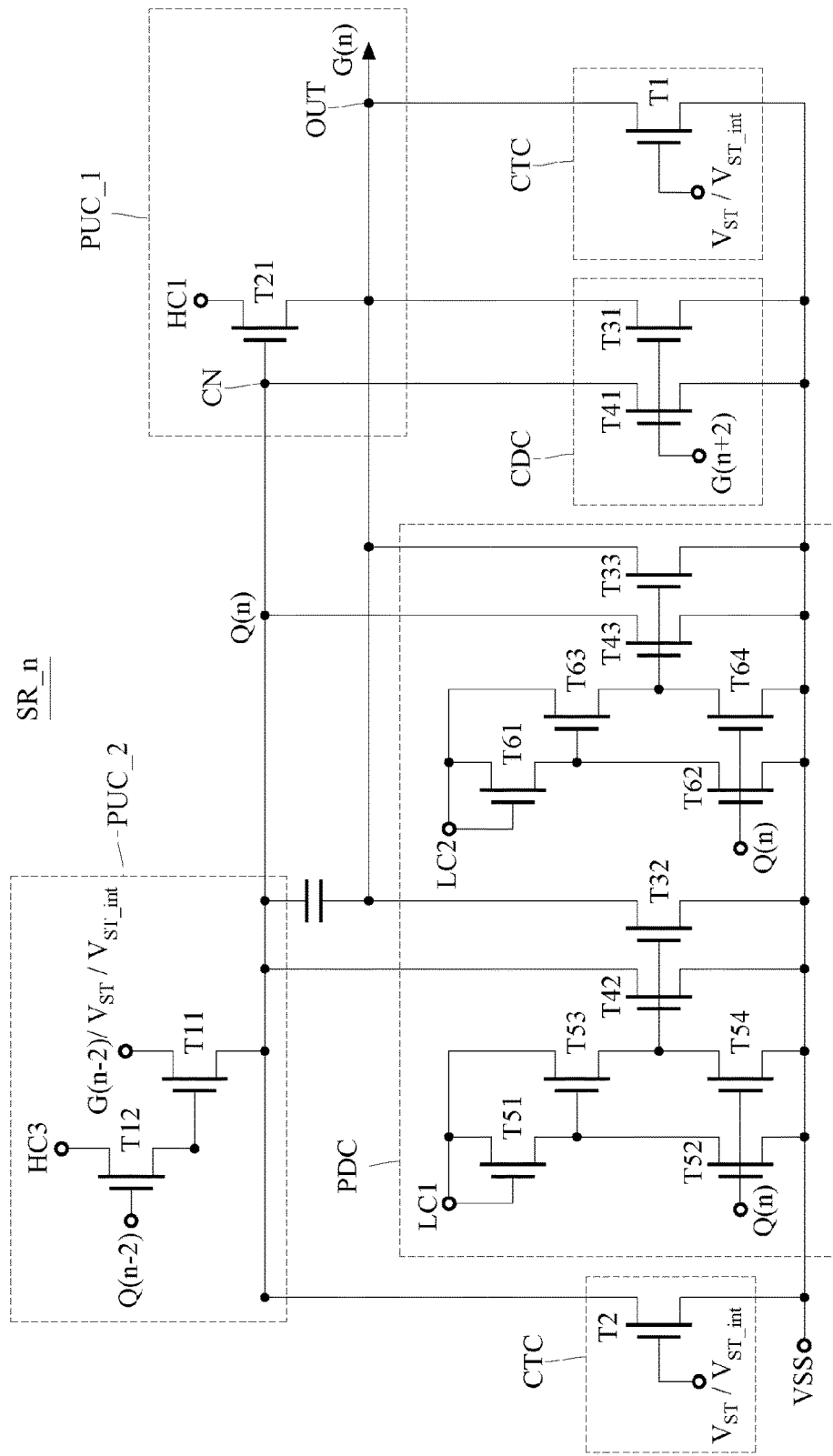
FIG. 7 is a circuit schema diagram of a shift register unit shown according to an embodiment of the present invention.

In an example, each of the plurality of shift register units SR_1 to SR_q of FIG. 1 includes a pull-up circuit configured to send, on the basis of a voltage of a control node, a clock signal corresponding to the shift register units SR_1 to SR_q to an output end. When the initiating signal $V_{ST}$ is received, the voltage of the control node and/or the output end of the shift register unit are or is adjusted to a reference voltage $V_{SS}$, so as to disable the scan signal lines of the panel 10. In a practical example, referring to FIG. 1 and FIG. 7, FIG. 7 is a circuit schema diagram of a shift register unit shown according to an embodiment of the present invention. As shown in FIG. 7, a shift register unit SR_1 includes a first pull-up circuit PUC_1. The first pull-up circuit PUC_1 includes a transistor T21, where a control end thereof is electrically coupled to a voltage of a first control signal Q(n) on a control node CN, a first end thereof is electrically coupled to a first clock signal HCl, and a second end thereof is electrically coupled to an output end OUT. When the shift register unit SR_1 is enabled, the voltage of the first control signal Q(n) in the first pull-up circuit PUC_1 is set to a high level. At this point, the transistor T21 is connected, so as to enable the first clock signal HCl to be transmitted to the output end OUT. That is, the first output signal G(n) of the output end OUT would be adjusted to a level of the first clock signal HCl, so as to enable a scan signal line GL_1 corresponding to the shift register unit SR_1. When the scan signal line GL_1 is enabled, in the panel 10, a first column of pixels Px corresponding to the scan signal line GL_1 are driven, so as to display corresponding image data. FIG. 7 merely shows a circuit schema of one of the shift register units as exemplary description, but other shift register units in the present invention also have the same schema.

In an embodiment, as shown in FIG. 7, the shift register unit SR_1 further includes a second pull-up circuit PUC_2, a pull-down circuit PDC, a clamping circuit CDC, and a control circuit CTC. The second pull-up circuit PUC_2 includes transistors T11 and T12. A control end of the transistor T12 is electrically coupled to a second control signal Q(n−2), a first end thereof is electrically coupled to a second clock signal HC3, and a second end thereof is electrically coupled to a control end of the transistor T11. A first end of the transistor T11 is electrically coupled to a second output signal G(n−2), and a second end thereof is electrically coupled to a first control signal Q(n). When the second control signal Q(n−2) and the second clock signal HC3 are both at a high level state, the transistor T11 is connected, so as to enable the first control signal Q(n) to be adjusted a level of the second output signal G(n−2). The pull-down circuit PDC includes transistors T33 to T64, and the pull-down circuit PDC adjusts, according to the first control signal Q(n) and pull-down signals LC1, LC2, the first output signal G(n) to a reference voltage $V_{SS}$. In an embodiment, when at least one level of the pull-down signal LC1 or the pull-down signal LC2 is in a high level state, a level of the first output signal G(n) is adjusted to the reference voltage $V_{SS}$.

The clamping circuit CDC includes a transistor T31 to and a transistor T41, and the clamping circuit CDC adjusts, according to a third output signal G(n+2), the first output signal G(n) and the first control signal Q(n) to the reference voltage $V_{SS}$. The control circuit CTC is electrically coupled to the first output signal G(n) and the first control signal Q(n), and a second pull-up circuit PUC_2 of a first stage shift register unit in the plurality of shift register units SR_1 to SR_q includes a signal output end (that is, an terminal in the shift register unit SR_n for receiving the second control signal Q2(n−2)), and receives an initiating signal $V_{ST}$, so as to update the display screen of the panel 10. The control circuit CTC adjusts, according to the initiating signal $V_{ST}$, the first output signal G(n) or the first control signal Q(n) to the reference voltage $V_{SS}$, so as to disable a plurality of scan signal lines GL_1 to GL_n of the panel. In an embodiment, the control circuit CTC includes a first transistor T1, where a control end thereof is configured to receive an initiating signal $V_{ST}$, a first end thereof is configured to output a first output signal G(n), and a second end thereof is configured to receive a reference voltage $V_{SS}$. The first transistor T1 is configured to pull down, according to the initiating signal $V_{ST}$, the first output signal Q(n) to the reference voltage $V_{SS}$. In another embodiment, the control circuit CTC includes a second transistor T2, where a control end thereof is configured to receive an initiating signal $V_{ST}$, a first end thereof is configured to output a first control signal Q(n), and a second end thereof is configured to receive a reference voltage $V_{SS}$. The second transistor T2 is configured to pull down, according to the initiating signal $V_{ST}$, the first control signal Q(n) to the reference voltage $V_{SS}$.

A practical example is used for description. When the shift register 13 receives the initiating signal $V_{ST}$, the control circuit CTC first adjusts voltages of first control signals Q(n) of control nodes CN in all of the shift register units SR_1 to SR_q and/or first output signals G(n) of output ends OUT thereof to the reference voltage $V_{SS}$. In practice, the reference voltage $V_{SS}$ is generally a low level voltage, a ground voltage, or a disable voltage. When the voltages of the first control signals Q(n) of the control nodes CN and/or the first output signals G(n) of the output ends OUT are adjusted to the reference voltage $V_{SS}$, a plurality of scan signal lines GL_1 to GL_m corresponding to the shift register units SR_1 to SR_n is disabled at the same time. At this time, a second pull-up circuit PUC_2 of the first stage shift register unit SR_1 receives an initiating signal $V_{ST}$, so as to enable the shift register 13 to start enabling the corresponding scan signal lines GL_1 to GL_m in sequence starting from the first stage shift register unit SR_1 to a next stage, so as to update the display screen of the panel 10. In an embodiment, the control circuit CTC includes the foregoing first transistor T1 and second transistor T2, when the control module 11 receives the initiating signal $V_{ST}$, voltages of the first output signal G(n) of the output end OUT and the first control signal Q(n) of the control node CN are respectively adjusted by using the first transistor T1 and the second transistor T2 to the reference voltage $V_{SS}$, which may further ensure that the plurality of scan signal lines GL_1 to GL_n can be disabled.

Figure 8:
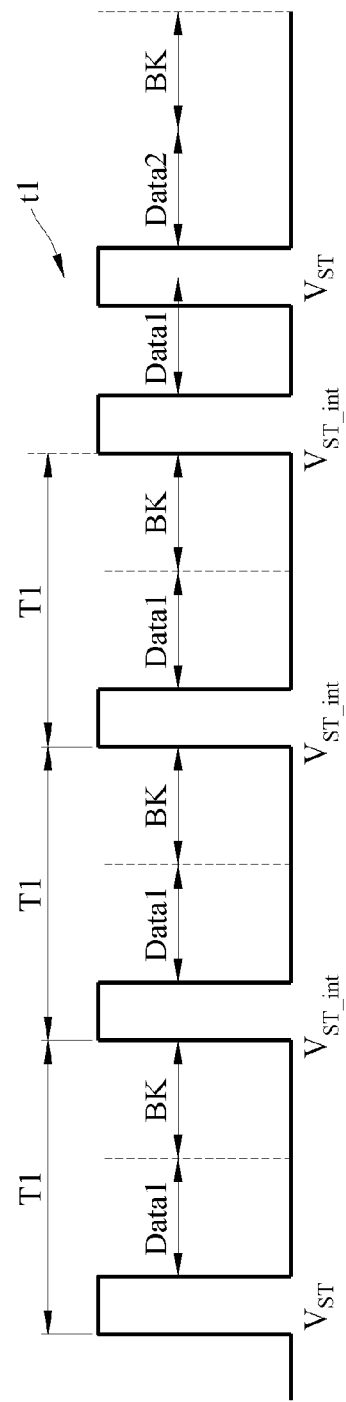
FIG. 8 is a waveform diagram of signal control shown according to an embodiment of the present invention.
Figure 9:
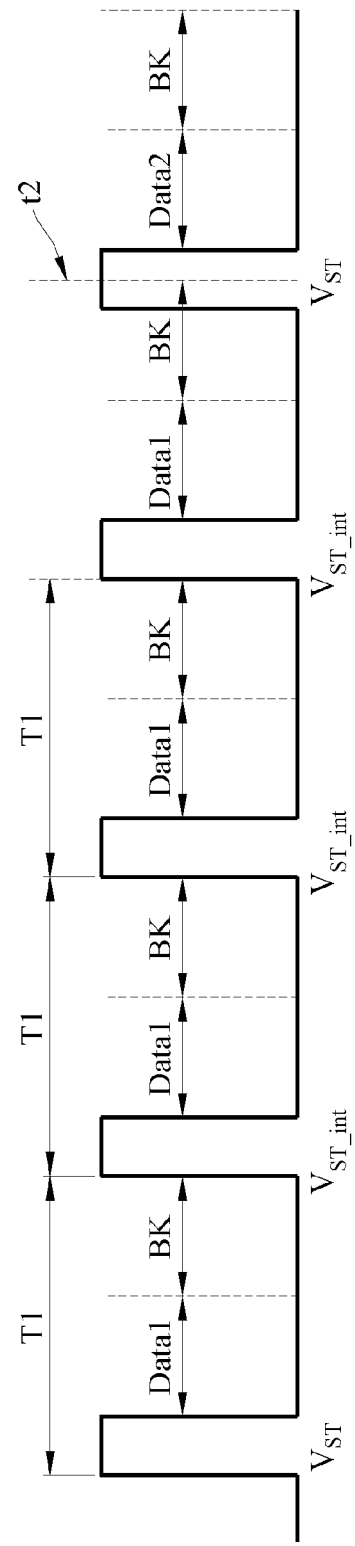
FIG. 9 is a waveform diagram of signal control shown according to an embodiment of the present invention.

It could be known from the preceding text that the control circuit CTC is mainly configured to pull down first output signals G(n) or first control signals Q(n) of the shift register units SR_1 to SR_n to a low level reference voltage $V_{SS}$. An objective thereof is preventing, in a process of enabling the corresponding scan signal lines GL_1 to GL_m and performing an update with the existing first image data Data1, the display screen of the panel 10 from generating an exception because reception of a next initiating signal $V_{ST}$ causes a plurality of scan signal lines in the panel 10 to be enabled. That is, when the next initiating signal is received, a plurality of scan signal lines GL_1 to GL_m of the panel 10 are enabled in sequence from the beginning, so that the panel 10 is updated with the second image data Data2. For example, referring to FIG. 1 and FIG. 8 together, FIG. 8 is a waveform diagram of signal control shown according to an embodiment of the present invention. As shown in FIG. 8, after receiving the first initiating signal $V_{ST}$ (the leftmost initiating signal $V_{ST}$ in FIG. 8), the control module 11 enables scan signal lines GL_1 to GL_n in sequence, so as to write the first data signal Data1. Subsequently, the determination unit 112 successively generates two internal signals $V_{ST\_int}$, and after receiving the two internal signals $V_{ST\_int}$, likewise, the control module 11 enables the scan signal lines GL_1 to GL_n in sequence, so as to rewrite the first data signal Data1. When the determination unit 112 generates a third internal signal $V_{ST\_int}$ and transmits it to the control module 11, the control module 11 starts to enable the scan signal lines in sequence from the scan signal line GL_1 to the scan signal line GL_n, so as to rewrite the first data signal Data1. As shown in FIG. 8, before the control module 11 completes enabling all of the scan signal lines GL_1 to GL_n, the control module 11 receives a next initiating signal $V_{ST}$. In other words, the control module 11 originally needs to complete enabling all of the scan signal lines GL_1 to GL_n at a time point t1. However, the control module 11 only enables one of the scan signal lines (for example, a 540th scan signal line of 1080 scan signal lines), so as to receive a next initiating signal $V_{ST}$. At this time, the control module 11 enables the first scan signal line by using the next initiating signal $V_{ST}$. In order to prevent the display screen from an exception because the first scan signal line and the 540th scan signal line are simultaneously enabled at the same time, the control circuit CTC pulls down first output signals G(n) or first control signals Q(n) of all of the shift register units SR_1 to SR_n to a low level reference voltage $V_{SS}$. In this way, the panel 10 can normally restart an enabling program starting from the first scan signal lines and further write the second image data Data2. In another embodiment, referring to FIG. 9, FIG. 9 is a waveform diagram of signal control shown according to an embodiment of the present invention. As shown in FIG. 9, when the determination unit 112 generates a third internal signal $V_{ST\_int}$ and transmits it to the control module 11, the control module 11 has enabled the scan signal lines GL_1 to GL_n in sequence and enters the blank interval BK. The blank interval BK originally needs to end at the time point t2, but because before the blank interval BK ends, the control module 11 has received a next initiating signal $V_{ST}$, in order to avoid a screen exception, the control circuit CTC pulls down the first output signals G(n) or first control signals Q(n) of all of the shift register units SR_1 to SR_n to the low level reference voltage $V_{SS}$.

Figure 10A:
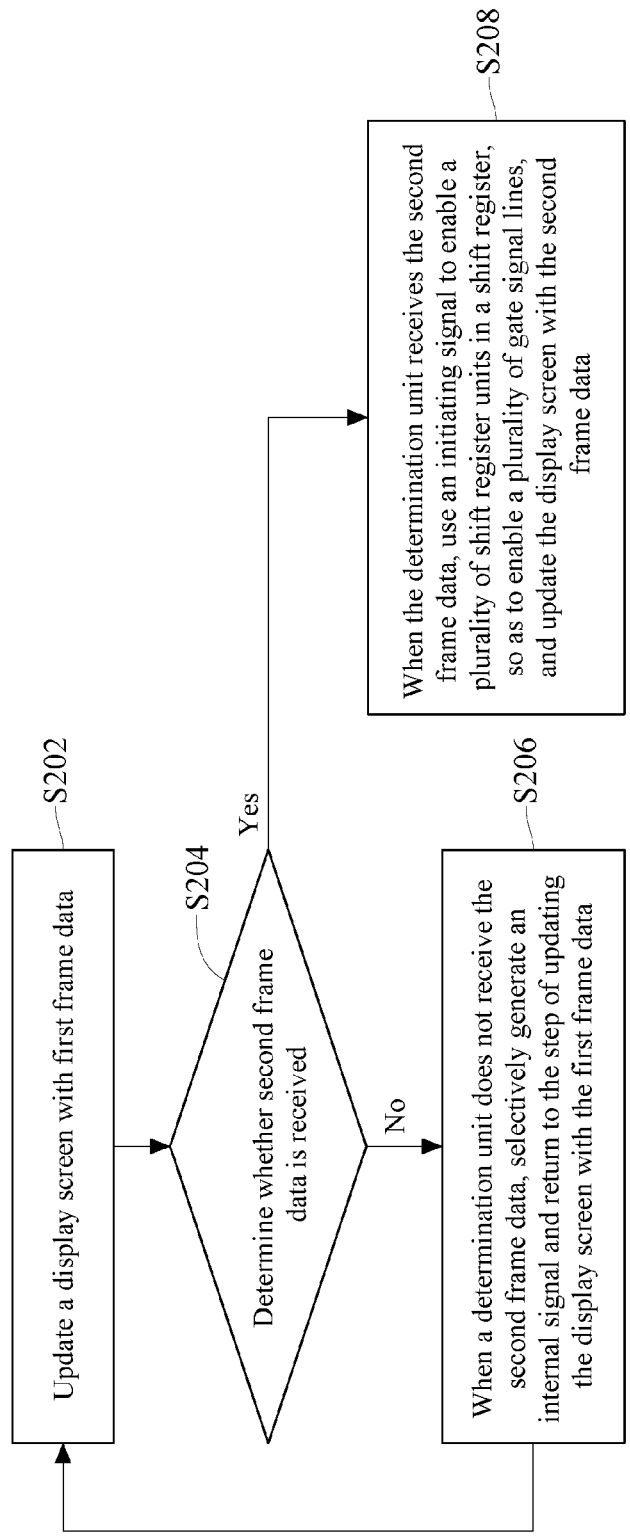
FIG. 10A is a flowchart of a signal controlling method shown according to an embodiment of the present invention.

Referring to FIG. 10A, FIG. 10A is a flowchart of a signal controlling method shown according to an embodiment of the present invention, and the signal controlling method is applicable to updating the display screen of the panel 10 in FIG. 1. Step S202: A control unit 116 of a control module 11 updates a display screen of a panel 10 with first image data Data1. Step S204: A determination unit 112 determines whether second image data Data2 is received. Step S206: When the determination unit 112 does not receive the second image data Data 2, the determination unit 112 selectively generates an internal signal $V_{ST\_int}$ and returns to Step S202 of updating the display screen of the panel 10 with the first image data Data1. Step S208: When the determination unit 112 receives an initiating signal $V_{ST}$ and the second image data Data2, the determination unit 112 uses the initiating signal $V_{ST}$ to enable a plurality of shift register units SR_1 to SR_q in a shift register 13, so as to enable a plurality of scan signal lines GL_1 to GL_m of the panel 10 in sequence, and updates the display screen with the second image data Data2.

Figure 10B:
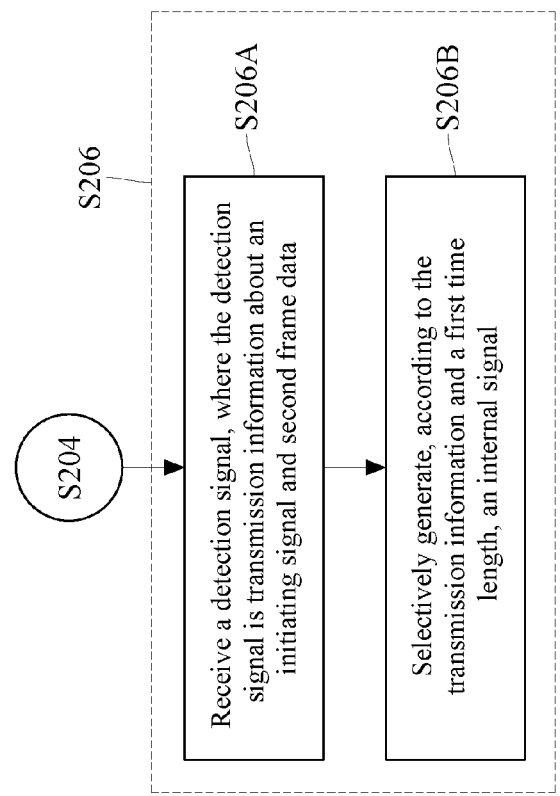
FIG. 10B is a flowchart of a signal controlling method shown according to another embodiment of the present invention.

In an embodiment, updating the display screen of the panel 10 with the first image data Data1 takes a first time length T1. Referring to FIG. 10B, FIG. 10B is a flowchart of a signal controlling method shown according to another embodiment of the present invention. As shown in FIG. 10B, in Step S206 of FIG. 10A, the step of when the initiating signal $V_{ST}$ and the second image data Data2 are not received, selectively generating an internal signal $V_{ST\_int}$ and returning to the step of updating the display screen of the panel 10 with the first image data Data1 further includes step S206A: The determination unit 112 receives a detection signal DS. The detection signal DS is transmission information MS about the initiating signal $V_{ST}$ and the second image data Data2. Step S206B: The determination unit 112 selectively generates, according to the transmission information MS and the first time length T1, the internal signal $V_{ST\_int}$.

Figure 10C:
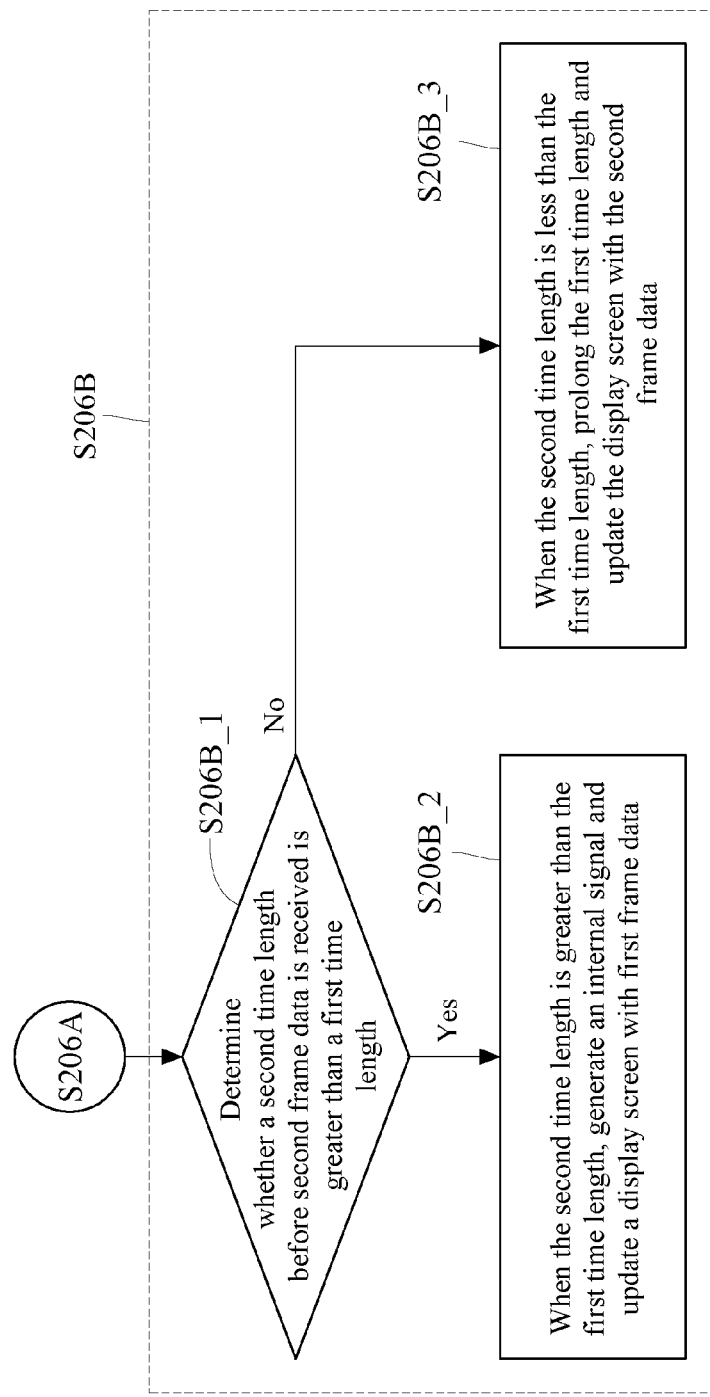
FIG. 10C is a flowchart of a signal controlling method shown according to another embodiment of the present invention.

Referring to FIG. 10C, FIG. 10C is a flowchart of a signal controlling method shown according to another embodiment of the present invention. As shown in FIG. 10C, in step S206B of FIG. 10B, the step of selectively generating, according to the transmission information MS and the first time length T1, the internal signal includes step S206B_1: The determination unit 112 determines whether a second time length T2 before the initiating signal $V_{ST}$ is received is greater than the first time length T1. Step S206B_2: When the second time length T2 is greater than the first time length T1, generate the internal signal $V_{ST\_int}$ and update the display screen of the panel 10 with the first image data Data1. Step S206B_3: When the second time length T2 is less than the first time length T1, prolong the first time length T1 and update the display screen of the panel 10 with the second image data Data2.

Figure 10D:
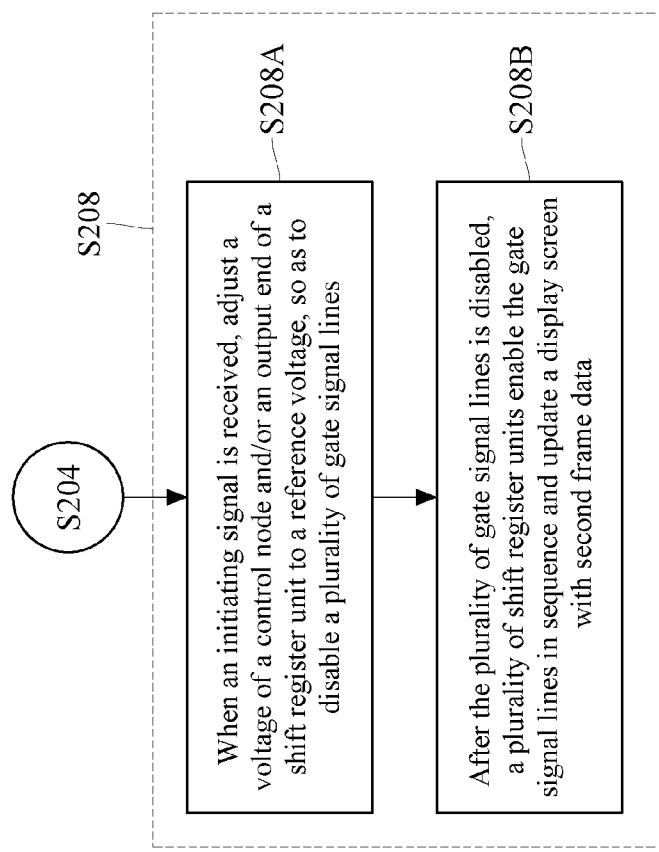
FIG. 10D is a flowchart of a signal controlling method shown according to another embodiment of the present invention.

Referring to FIG. 10D, FIG. 10D is a flowchart of a signal controlling method shown according to another embodiment of the present invention. As shown in FIG. 10D, in Step S208 of FIG. 10A, the step of when an initiating signal $V_{ST}$ and the second image data Data2 are received, updating the display screen with the second image data Data2 includes Step S208A: When the initiating signal $V_{ST}$ is received, adjust a voltage of a control node CN and/or output ends of the shift register units SR_1 to SR_q to a reference voltage $V_{SS}$, so as to disable the scan signal lines GL_1 to GL_m of the panel 10. Subsequently, Step S208B: After the scan signal lines GL_1 to GL_m are disabled, the shift register units SR_1 to SR_q enable the scan signal lines GL_1 to GL_m in sequence, and update the display screen of the panel 10 with the second image data Data2.

In conclusion, in the signal controlling method and display panel of the present invention, a plurality of internal signals is generated between two adjacent initiating signals to further update a display screen with first image data repeatedly, so as to reduce the risk of the panel material polarization when the panel performs frequency switching, thereby alleviating a brightness difference of a display screen. In addition, when a next initiating signal is received, by means of disposition of a control circuit, the display screen is prevented from an exception caused by enabling a plurality of scan signal lines at the same time.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A signal controlling method, applicable to update a display screen of a panel, comprising:
   updating the display screen according to first image data;
   determining whether second image data is received;
   when the second image data is not received, selectively generating an internal signal, using the internal signal to enable a shift register, and returning to the step of updating the display screen with the first image data; and
   when the second image data is received, using an initiating signal to enable a plurality of shift register units in the shift register, so as to enable a plurality of scan signal lines of the panel in sequence, and updating the display screen with the second image data;
   wherein the updating the display screen according to the first image data takes a first time length, and the step of when the second image data is not received, selectively generating the internal signal, using the internal signal to enable the shift register, and returning to the step of updating the display screen with the first image data comprises:
   receiving a detection signal, wherein the detection signal is transmission information about the second image data; and
   selectively generating, according to the transmission information and the first time length, the internal signal.

2. The signal controlling method according to claim 1, wherein the step of selectively generating, according to the transmission information and the first time length, the internal signal comprises:
   determining whether a second time length before the second image data is received is greater than the first time length;
   when the second time length is greater than the first time length, generating the internal signal and updating the display screen according to the first image data; and
   when the second time length is less than the first time length, prolonging the first time length and updating the display screen according to the second image data.

3. The signal controlling method according to claim 1, wherein each of the plurality of shift register units comprises a first pull-up circuit, the first pull-up circuit is configured to output, based on a voltage of a control node, a scan signal from an output end of the shift register unit according to a clock signal corresponding to the shift register unit, so as to enable a corresponding pixel, the step of when the second image data is received, updating the display screen according to the second image data comprises:
   when the initiating signal is received, adjusting the voltage of the control node and/or the output end of the shift register unit to a reference voltage, so as to disable the scan signal lines of the panel; and
   after the scan signal lines are disabled, enabling, by the shift register units, the scan signal lines in sequence, and updating the display screen according to the second image data.

4. A display panel, comprising:
   a panel; and
   a control module, electrically coupled to the panel, wherein the control module is configured to update a display screen of the panel according to first image data and when second image data is not received, generate an internal signal, the control module is further configured to use the internal signal to enable a shift register of the display panel and update the display screen with the first image data, and when the second image data is received, the control module is further configured to use an initiating signal to enable a plurality of shift register units in the shift register, so as to enable a plurality of scan signal lines of the panel in sequence, and update the display screen according to the second image data;
   wherein the control module comprises:
   a register unit;
   a determination unit, configured to determine, after the display screen is updated according to the first image data, whether the second image data is received, and when the determination unit determines that the second image data is received, transmit the second image data and update the register unit according to the second image data; and
   a control unit, electrically coupled to the determination unit and the register unit, wherein when the determination unit determines that the second image data is not received, the control unit is configured to generate the internal signal and update, according to the internal signal, the display screen according to the first image data, and when the determination unit determines that the second image data is received, the control unit updates, according to the initiating signal, the display screen according to the second image data.

5. The display panel according to claim 4, wherein the updating the display screen according to the first image data takes a first time length, the determination unit is further configured to receive a detection signal, the detection signal is transmission information about the second image data, and when the determination unit does not receive the second image data, the control unit is further configured to selectively generate, according to the transmission information and the first time length, the internal signal.

6. The display panel according to claim 5, wherein when the determination unit determines when a second time length before the second image data is received is greater than the first time length, the control unit is further configured to generate the internal signal, and the control unit updates, according to the internal signal, the display screen with the first image data, and when the determination unit determines that the second time length is less than the first time length, the first time length is prolonged, and the control unit is further configured to read image data stored in the register unit, so as to update the display screen.

7. The display panel according to claim 4, wherein each of the plurality of shift register units comprises a first pull-up circuit, the first pull-up circuit is configured to output, based on a voltage of a control node, a scan signal from an output end of the shift register unit according to a clock signal corresponding to the shift register unit, and when the control module generates the initiating signal, the control module further is configured to adjust the voltage of the control node and/or the output end of the shift register unit to a reference voltage, so as to update the display screen with the second image data.

8. A display panel, comprising:
a panel, having a plurality of pixels;
a control module, electrically coupled to the panel and configured to provide an initiating signal; and
a shift register, electrically coupled to the panel, wherein the shift register comprises:
a plurality of shift register units, wherein the shift register units are connected in series to each other, a first stage of the shift register units is configured to be enabled according to the initiating signal, at least one of the shift register units comprises:
a first pull-up circuit, configured to output, based on a first control signal, a scan signal on an output end of the shift register unit according to a clock signal corresponding to the shift register unit, so as to enable the corresponding pixels; and
a control circuit, electrically coupled to the first pull-up circuit, wherein the control circuit is configured to adjust, according to the initiating signal, an terminal of the first pull-up circuit configured to receive the first control signal and an terminal of the control circuit configured to output the scan signal to a first reference voltage, so as to disable at least one of a plurality of scan signal lines of the panel.

9. The display panel according to claim 8, wherein the control circuit comprises:
a first transistor, comprising a control end, a first end, and a second end, wherein the control end of the first transistor is configured to receive the initiating signal, the first end of the first transistor is configured to output a first output signal, the second end of the first transistor is configured to receive the first reference voltage, and the first transistor is configured to adjust, according to the initiating signal, the first output signal to the first reference voltage.

10. The display panel according to claim 8, wherein the control circuit comprises:
a second transistor, comprising a control end, a first end, and a second end, wherein the control end of the second transistor is configured to receive the initiating signal, the first end of the second transistor is configured to receive the first control signal, the second end of the second transistor is configured to receive the first reference voltage, the second transistor is configured to adjust, according to the initiating signal, the first control signal to the first reference voltage.

11. The display panel according to claim 8, wherein at least one of the shift register units further comprises a second pull-up circuit, configured to adjust, according to a second control signal and a second clock signal, a level of the first control signal to a level of a second output signal.

12. The display panel according to claim 8, wherein the control circuit is configured to disable all the scan signal lines of the panel.

* * * * *